(12) United States Patent
Sasaki

(10) Patent No.: US 7,125,600 B2
(45) Date of Patent: Oct. 24, 2006

(54) SETTER, METHOD FOR MANUFACTURING CERAMIC SUBSTRATE, AND CERAMIC SUBSTRATE

(75) Inventor: Satoshi Sasaki, Akita (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/125,261

(22) Filed: May 10, 2005

(65) Prior Publication Data

US 2006/0014038 A1    Jan. 19, 2006

(30) Foreign Application Priority Data

May 24, 2004  (JP)  ............................ P2004-153808
Apr. 22, 2005  (JP)  ............................ P2005-125470

(51) Int. Cl.
*B32B 1/00* (2006.01)
*B28B 1/00* (2006.01)
*F27D 5/00* (2006.01)

(52) U.S. Cl. ...................... 428/141; 428/325; 264/679; 264/681; 432/253; 432/258

(58) Field of Classification Search ...................... None
See application file for complete search history.

(56) References Cited

U.S. PATENT DOCUMENTS 2,609,318 A * 9/1952 Swentzel ..................... 428/450
6,001,761 A * 12/1999 Hata et al. ................... 501/103

FOREIGN PATENT DOCUMENTS

| JP | A 62-128973 | 6/1987 |
|---|---|---|
| JP | A 01-282157 | 11/1989 |
| JP | A 08-091944 | 4/1996 |
| JP | A 09-157038 | 6/1997 |
| JP | A 2001-192274 | 7/2001 |
| JP | A 2002-104891 | 4/2002 |

* cited by examiner

*Primary Examiner*—Jennifer C. McNeil
*Assistant Examiner*—Timothy M. Speer
(74) *Attorney, Agent, or Firm*—Oliff & Berridge, PLC

(57) ABSTRACT

A setter and a method for manufacturing a ceramic substrate are capable of suppressing deformation such as warpage occurring in a ceramic substrate after baking. A ceramic green sheet 4 is mounted and baked on a mount surface of a zirconia setter wherein an average particle size is 0.3 μm, a porcelain density is not less than 6 kg/dm$^3$, a thermal conductivity is not more than 5 W/mK, and an arithmetic average roughness of the mount surface is 1 μm–20 μm, whereby it is feasible to suppress the deformation such as warpage occurring in a piezoelectric ceramic substrate after baked.

2 Claims, 10 Drawing Sheets

SETTER, METHOD FOR MANUFACTURING CERAMIC SUBSTRATE, AND CERAMIC SUBSTRATE

BACKGROUND OF THE INVENTION

1. Field of the Invention

The present invention relates to a setter and a method for manufacturing a ceramic substrate for baking a ceramic green sheet to form a ceramic substrate, and to a ceramic substrate manufactured by the method.

2. Related Background Art

One of the conventional techniques of this type is, for example, a jig for baking of electronic components described in Japanese Patent Application Laid-Open No. 2002-104891. This electronic component baking jig is constructed in the structure in which a surface layer containing a zirconia material such as zirconia or stabilized zirconia 99.5% or more by weight is formed on a base. The Application Laid-Open No. 2002-104891 describes that when an electronic component containing ceramics is mounted and baked on the surface layer, the electronic component can be prevented from being contaminated and it becomes feasible to produce the electronic component with high quality demonstrating stable characteristics.

SUMMARY OF THE INVENTION

However, if the electronic component baking jig described in the Application Laid-Open No. 2002-104891 is used as a setter to bake a ceramic green sheet to form a ceramic substrate, the ceramic substrate after baked might undergo deformation such as warpage. This problem becomes more prominent with decrease in the thickness of the ceramic green sheet in order to obtain a thin-shaped ceramic substrate.

The present invention has been accomplished in view of the above circumstances, and an object of the invention is to provide a setter and a method for manufacturing a ceramic substrate capable of suppressing the deformation such as warpage occurring in a ceramic substrate after baked, and to provide a ceramic substrate manufactured by the method.

The Inventors conducted elaborate research in order to achieve the above object. As a result of the research, the Inventors discovered that the deformation such as warpage occurring in the ceramic substrate after baked could be suppressed by mounting and baking a ceramic green sheet on a mount surface of a setter wherein an average particle size was 0.3 µm–2.5 µm, a porcelain density was not less than 6 kg/dm$^3$, a thermal conductivity was not more than 5 W/mK, and an arithmetic average roughness of the mount surface was 1 µm–20 µm, thereby accomplishing the present invention.

Namely, a setter according to the present invention is a setter having a mount surface on which a ceramic green sheet is to be mounted in baking the ceramic green sheet to form a ceramic substrate, wherein an average particle size is 0.3 µm–2.5 µm, a porcelain density is not less than 6 kg/dm$^3$, a thermal conductivity is not more than 5 W/mK, and an arithmetic average roughness of the mount surface is 1 µm–20 µm.

A method for manufacturing a ceramic substrate according to the present invention is a method for manufacturing a ceramic substrate, the method for baking a ceramic green sheet to form a ceramic substrate, the method comprising the steps of: preparing a setter wherein an average particle size is 0.3 µm–2.5 µm, a porcelain density is not less than 6 kg/dm$^3$, a thermal conductivity is not more than 5 W/mK, and an arithmetic average roughness of a mount surface is 1 µm–20 µm; and mounting and baking the ceramic green sheet on the mount surface of the setter.

When the setter is so constructed that the average particle size of particles forming the setter is 0.3 µm–2.5 µm and that the porcelain density of the setter is not less than 6 kg/dm$^3$ as described above, a component, e.g., lead or the like, is prevented from evaporating from the ceramic green sheet and diffusing into the setter during the baking, whereby the composition of the ceramic green sheet can be kept uniform during the baking. Furthermore, when the setter is so constructed that the thermal conductivity of the setter is not more than 5 W/mK and that the arithmetic average roughness of the mount surface of the setter is 1 µm–20 µm, the difference of heat histories due to the baking can be made smaller between the setter-side surface and the other surface in the ceramic green sheet, whereby the ceramic green sheet can be uniformly baked. From the above it follows that the deformation such as warpage occurring in the ceramic substrate after baked can be suppressed by mounting and baking the ceramic green sheet on the mount surface of the setter as described above.

DESCRIPTION OF THE PREFERRED EMBODIMENTS

The preferred embodiment of the present invention will be described below in detail with reference to the drawings.

The present embodiment is directed to production of piezoelectric ceramic substrates consisting primarily of lead titanate or lead zirconate titanate. Such piezoelectric ceramic substrates are applied to various products such as ceramic oscillators, ceramic filters, piezoelectric buzzers, piezoelectric sensors, and piezoelectric actuators.

Figure 1:
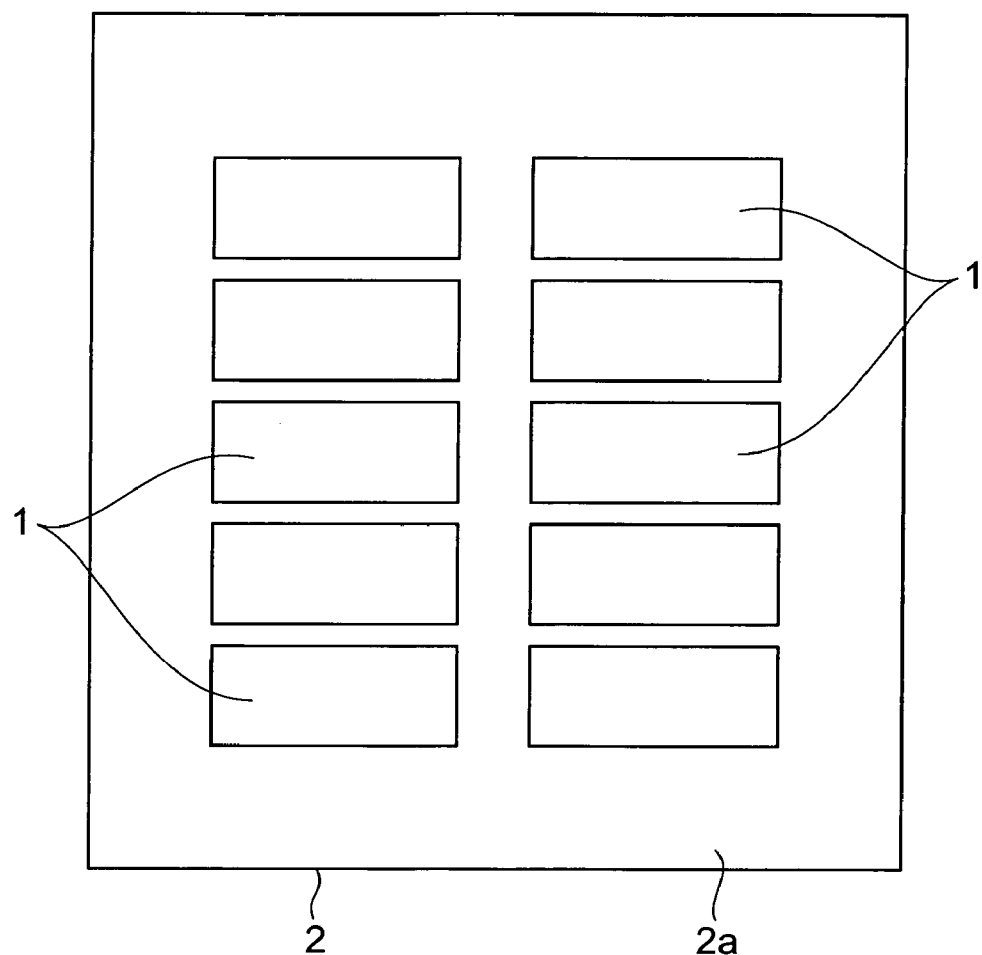
FIG. 1 is a plan view showing a state in a debindering step of ceramic green sheets in an embodiment of the method for manufacturing a ceramic substrate according to the present invention.
Figure 2:
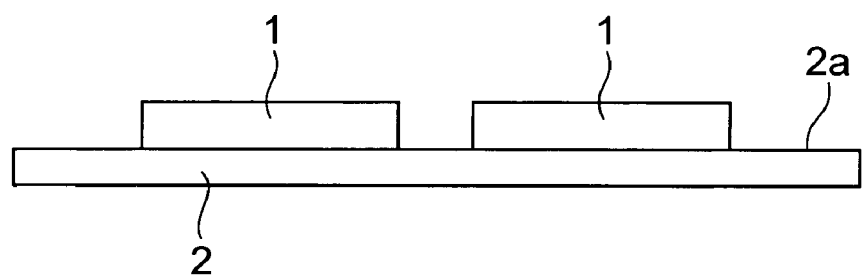
FIG. 2 is a side view showing a state in a debindering step of ceramic green sheets in an embodiment of the method for manufacturing a ceramic substrate according to the present invention.

For producing the above-described piezoelectric ceramic substrates, as shown in FIGS. 1 and 2, a zirconia setter 2 on which ceramic green sheets 1 are to be mounted is first prepared. This zirconia setter 2 is as fine as the porosity is less than 1%, and a material thereof is, for example, one obtained by adding yttria ($Y_2O_3$) as a stabilizer into zirconia. The stabilizer can be calcia (CaO), magnesia (MgO), ceria ($CeO_2$) or the like as well as yttria ($Y_2O_3$). An amount of the stabilizer to be added is preferably 6 mol %–14 mol % and more preferably 8 mol %–12 mol % in terms of achieving the stabilizing effect.

After the zirconia setter 2 is prepared, the ceramic green sheets 1 are prepared as follows. First, an organic binder, an organic solvent, etc. are added into a piezoelectric ceramic powder consisting primarily of lead titanate or lead zirconate titanate to obtain a paste, and a green sheet is obtained by forming a sheet from the paste by the doctor blade method. Subsequently, internal electrodes are formed on this green sheet by screen printing, and a plurality of such green sheets with the internal electrodes formed thereon are stacked to obtain a green laminate. Then this green laminate is cut in a predetermined size to obtain ceramic green sheets 1.

After fabrication of ceramic green sheets 1, as shown in FIGS. 1 and 2, a plurality of ceramic green sheets 1 are mounted on the mount surface 2a of the zirconia setter 2. Then the ceramic green sheets 1 are subjected to debindering while keeping the temperature stable at 400° C. for ten hours, for example.

Figure 3:
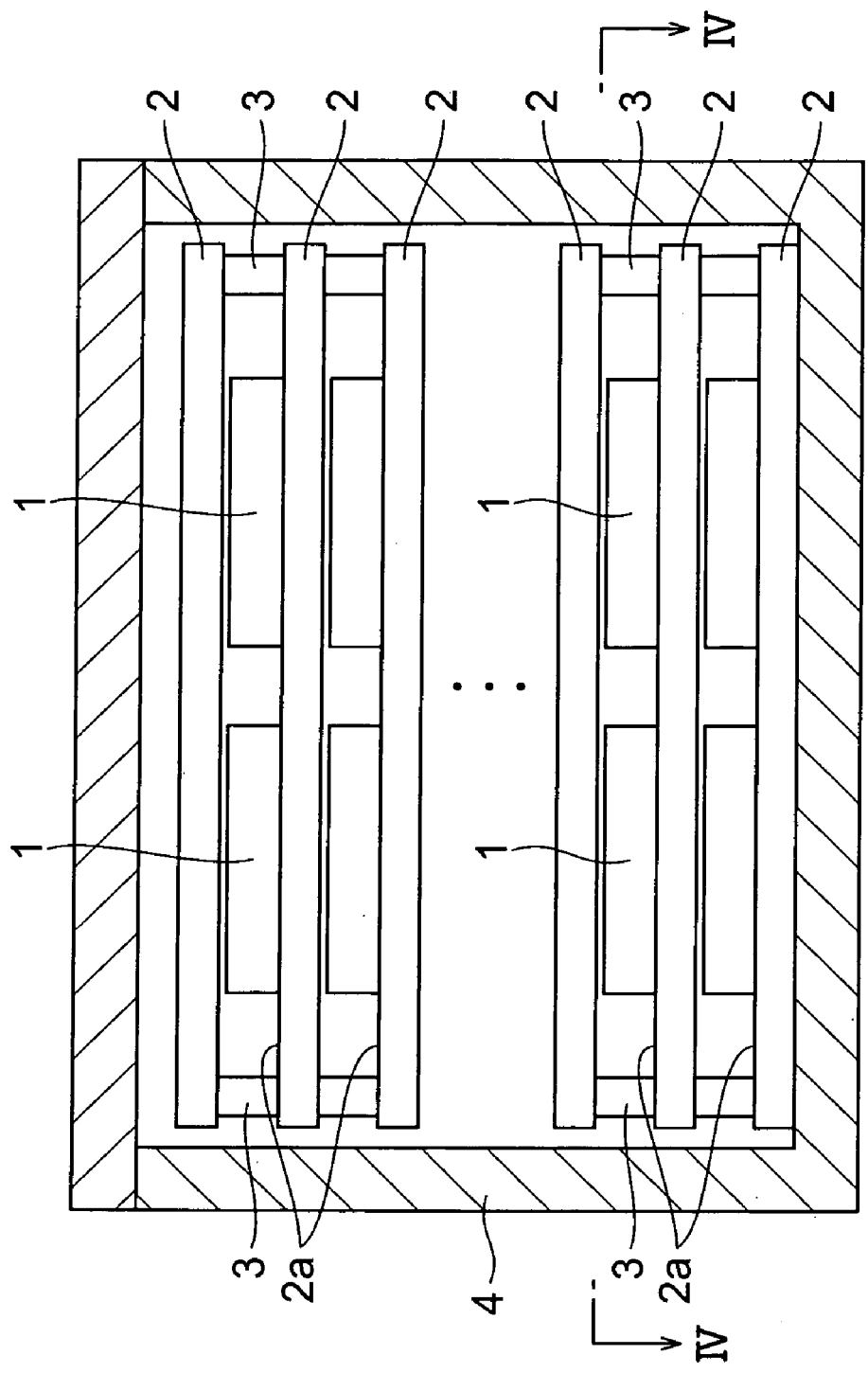
FIG. 3 is a side view showing a state in a baking step of ceramic green sheets in an embodiment of the method for manufacturing a ceramic substrate according to the present invention.
Figure 4:
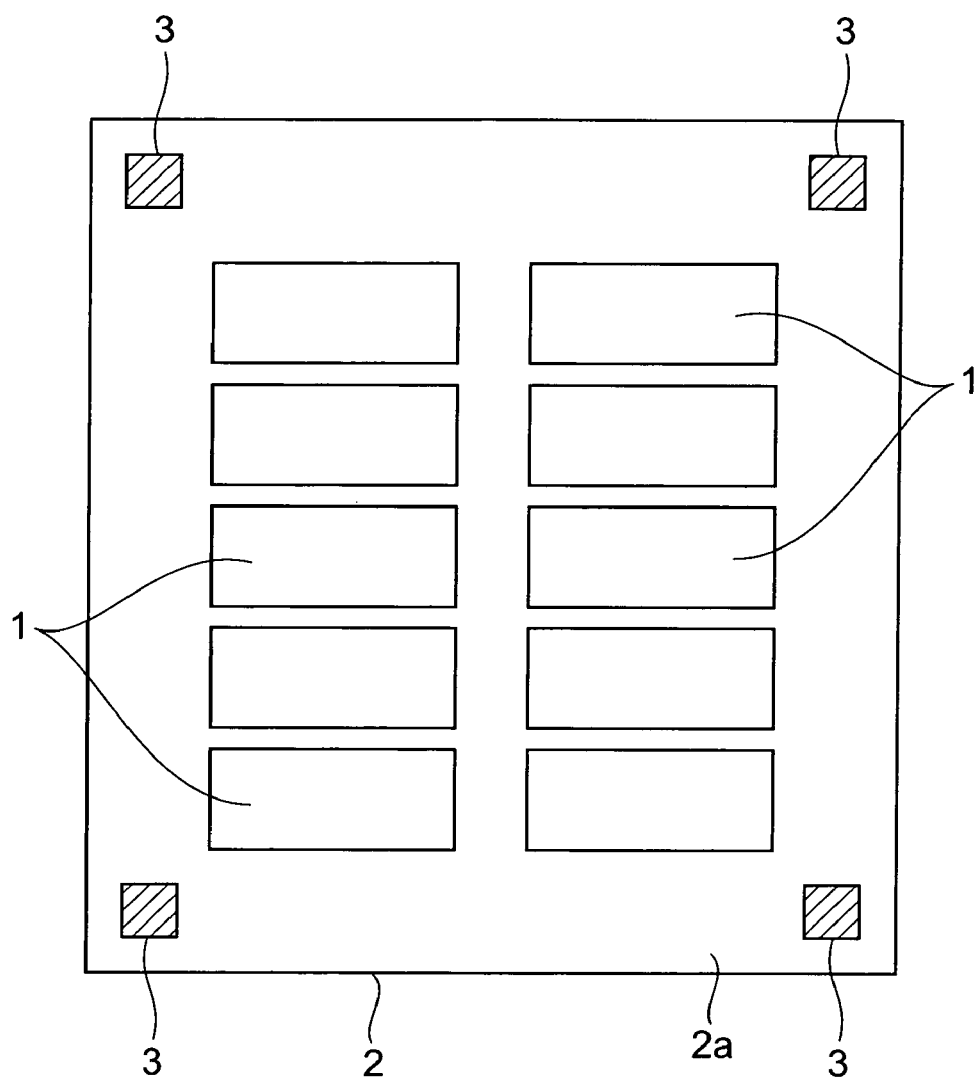
FIG. 4 is a sectional view along line IV—IV of FIG. 3.

After the debindering step of ceramic green sheets 1, as shown in FIGS. 3 and 4, plural stages of zirconia setters 2 with debindered ceramic green sheets 1 thereon are stacked while placing spacers 3 at the four corners of the mount surface 2a of each zirconia setter 2. A zirconia setter 2 with no ceramic green sheet 1 thereon is further stacked as a top stage. Then the zirconia setters 2 thus stacked are placed in a hermetically closed sagger 4 and the ceramic green sheets 1 are baked while keeping the temperature stable at 1100° C. for two hours, for example, to obtain piezoelectric ceramic substrates.

Next, the aforementioned zirconia setter 2 will be described in more detail.

The zirconia setter 2 simultaneously satisfies the following conditions of (1) to (4): (1) the average particle size of constituent particles is 0.3 μm–2.5 μm; (2) the porcelain density is not less than 6 kg/$dm^3$; (3) the thermal conductivity is not more than 5 W/mK; (4) the arithmetic average roughness of mount surface 2a is 1 μm to 20 μm. The reasons for the numerical limitations in the conditions of (1) to (4) are as described below. The zirconia setters 2 and piezoelectric ceramic substrates in the description below are those obtained by a method similar to a method for manufacturing zirconia setters in examples described later.

(1) Reason Why Average Particle Size of Constituent Particles is 0.3 μm–2.5 μm

Figure 5:
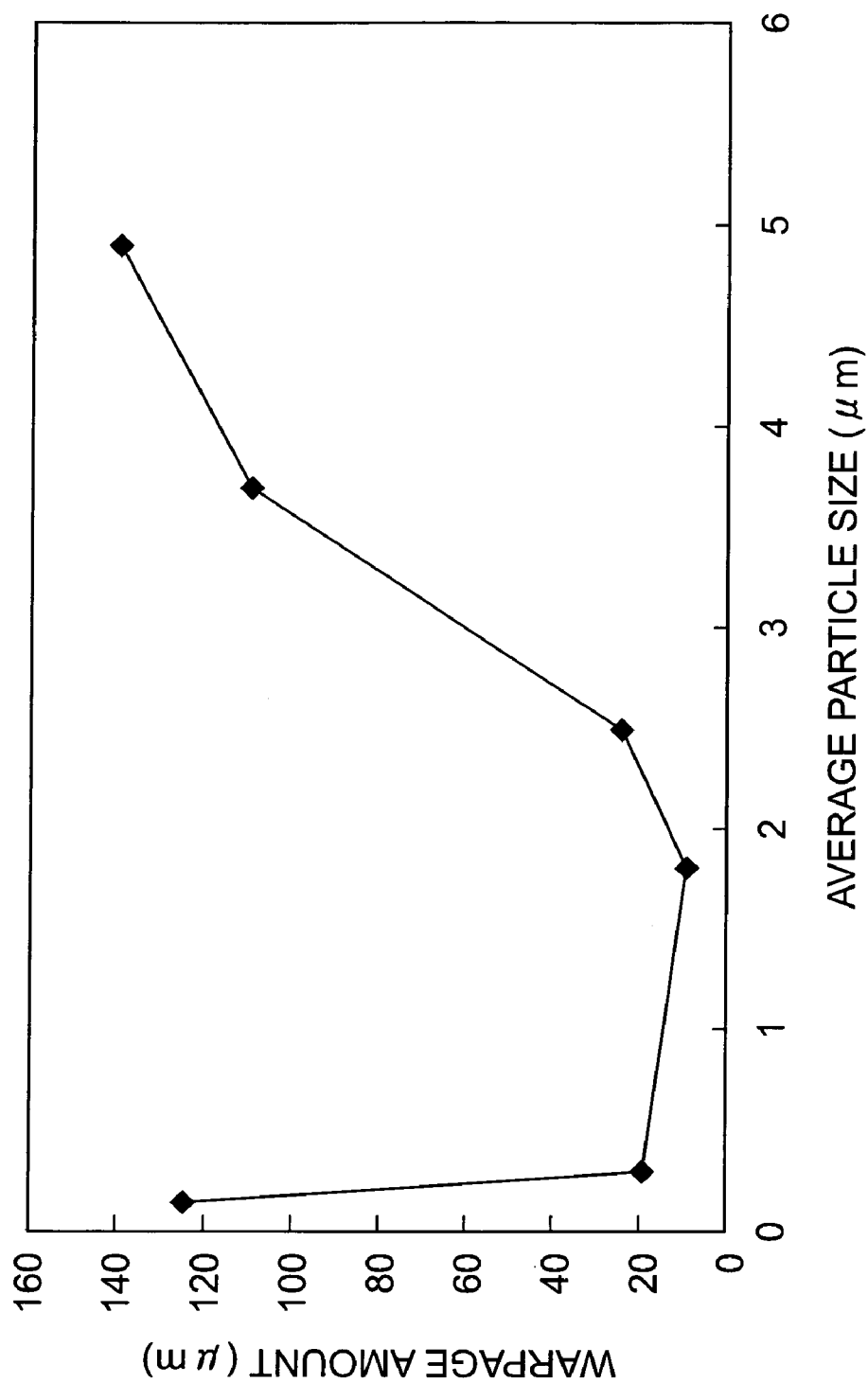
FIG. 5 is a graph showing a relation between average particle size of particles forming zirconia setters and amount of warpage of piezoelectric ceramic substrates.

FIG. 5 is a graph showing a relation between average particle size of particles forming zirconia setters 2 and amount of warpage of piezoelectric ceramic substrates. The other conditions in this case were the porcelain density: 6 kg/$dm^3$, the thermal conductivity: 4.5 W/mK, and the arithmetic average roughness of mount surface 2a: 5 μm. The warpage amount is a maximum level difference of a piezoelectric ceramic substrate measured with a laser contactless 3D shape measuring apparatus.

As apparent from the same drawing, the warpage amount of the piezoelectric ceramic substrate was controlled to below 30 μm in the range where the average particle size was 0.3 μm to 2.5 μm. The reason for it is as follows. When the average particle size is 0.3 μm–2.5 μm, the clearance is narrow between particles, so that the component such as lead can be prevented from evaporating from ceramic green sheet 1 and diffusing into zirconia setter 2 during the baking, whereby the composition of ceramic green sheet 1 can be kept uniform during the baking.

In contrast to it, the warpage amount of the piezoelectric ceramic substrate increased in the ranges where the average particle size was below 0.3 μm and over 2.5 μm. The reason for it is as follows. The clearance becomes wider between particles and the component such as lead becomes likely to evaporate from ceramic green sheet 1 and diffuse into zirconia setter 2 during the baking, so as to make the composition of ceramic green sheet 1 nonuniform during the baking. In addition, the evaporation of the component of lead or the like from the ceramic green sheet 1 could cause deviation of the composition of the piezoelectric ceramic substrate after baked, from a desired composition, and the diffusion of the component of lead or the like into the zirconia setter 2 could cause the component to react with the components forming the zirconia setter 2, so as to raise the problem of deterioration of zirconia setter 2.

(2) Reason why Porcelain Density is not less than 6 kg/$dm^3$

Figure 6:
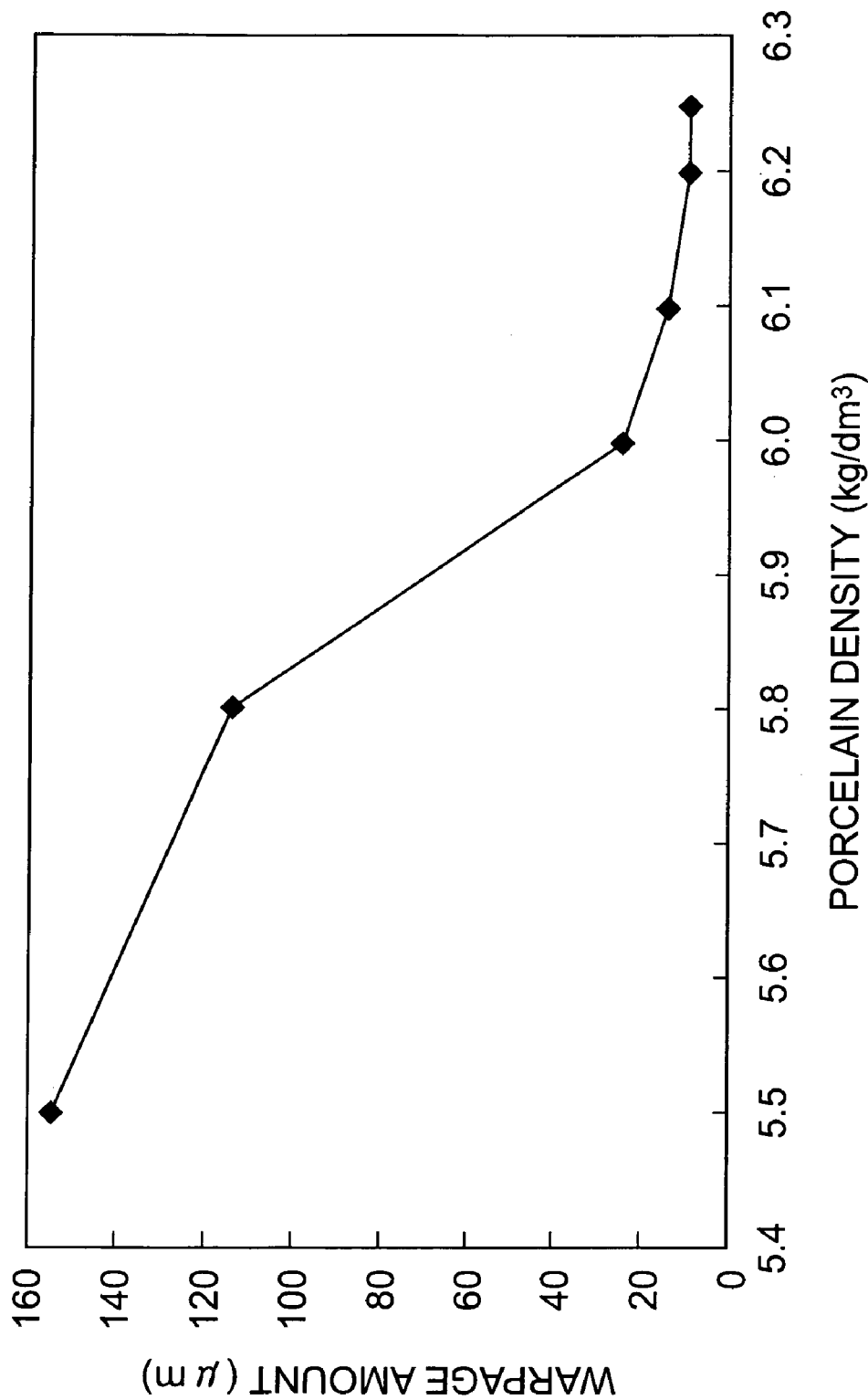
FIG. 6 is a graph showing a relation between porcelain density of zirconia setters and amount of warpage of piezoelectric ceramic substrates.

FIG. 6 is a graph showing a relation between porcelain density of zirconia setters 2 and warpage amount of piezoelectric ceramic substrates. The other conditions in this case were the average particle size: 1.8 μm, the thermal conductivity: 4.5 W/mK, and the arithmetic average roughness of mount surface 2a: 5 μm.

As apparent from the same figure, the warpage amount was controlled to below 30 μm in the range where the porcelain density was not less than 6 kg/$dm^3$. The reason for it is as follows. In the range where the porcelain density is not less than 6 kg/$dm^3$, the component of lead or the like can be prevented from evaporating from ceramic green sheet 1 and diffusing into the zirconia setter 2 during the baking, whereby the composition of the ceramic green sheet 1 can be kept uniform during the baking.

In contrast to it, the warpage amount of the piezoelectric ceramic substrate increased in the range where the porcelain density was below 6 kg/$dm^3$. The reason for it is as follows. The clearance becomes wider between particles and the component of lead or like becomes likely to evaporate from ceramic green sheet 1 and diffuse into the zirconia setter 2 during the baking, so as to make the composition of ceramic green sheet 1 nonuniform during the baking. In addition, there could arise the same problem as in the case of the aforementioned average particle size.

(3) Reason why thermal conductivity is not more than 5 W/mK

Figure 7:
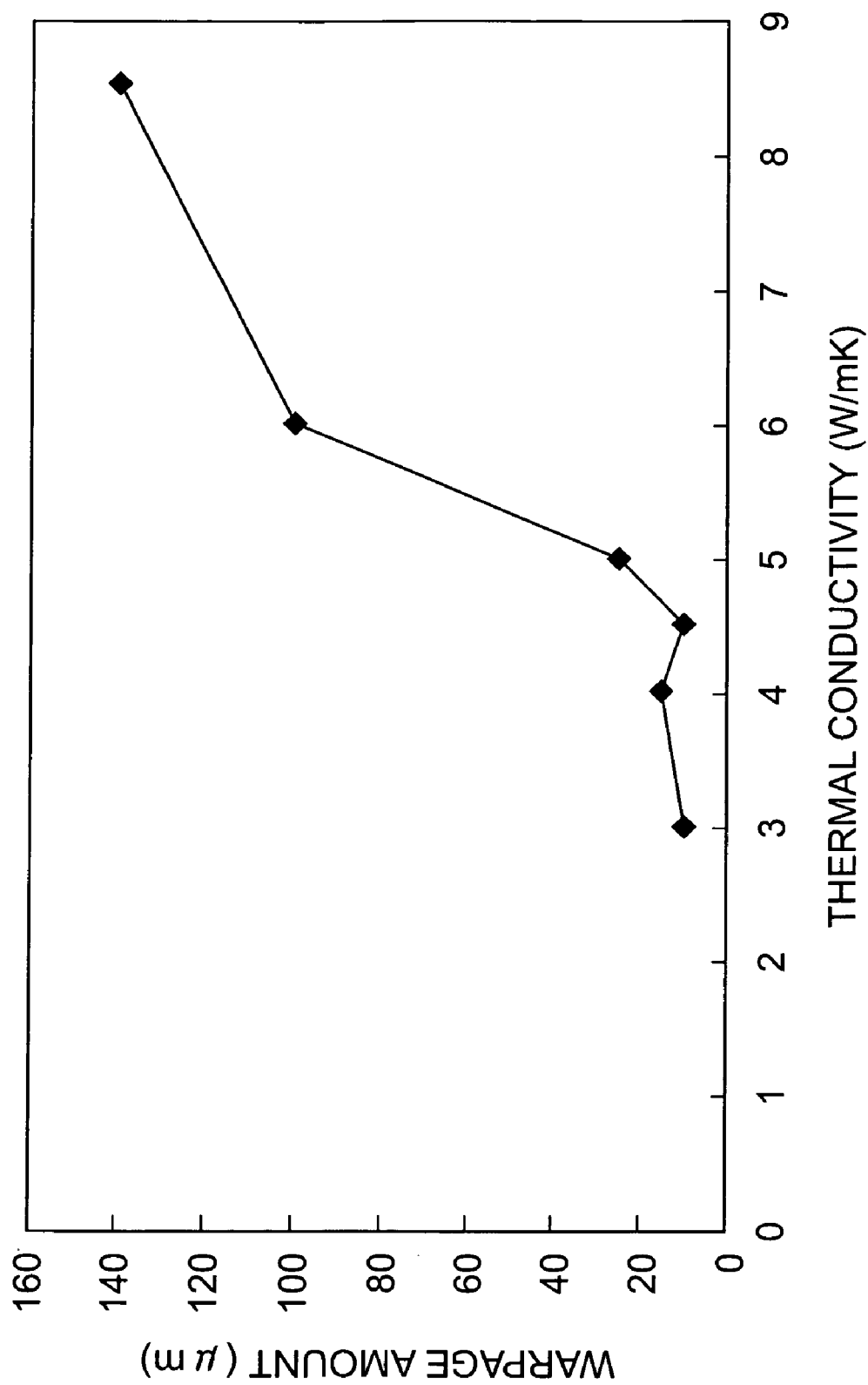
FIG. 7 is a graph showing a relation between thermal conductivity of zirconia setters and amount of warpage of piezoelectric ceramic substrates.

FIG. 7 is a graph showing a relation between thermal conductivity of zirconia setters 2 and warpage amount of piezoelectric ceramic substrates. The other conditions in this case were the average particle size: 1.8 μm, the porcelain density: 6 kg/$dm^3$, and the arithmetic average roughness of mount surface 2a : 5 μm.

As apparent from the same figure, the warpage amount was controlled to below 30 μm in the range where the thermal conductivity was not more than 5 W/mK. The reason for it is as follows. In the range where the thermal conductivity is not more than 5 W/mK, the difference of thermal histories due to baking can be made smaller between the surface of ceramic green sheet 1 on the zirconia setter 2 side and the other surface, whereby the ceramic green sheet 1 can be uniformly baked.

In contrast to it, the warpage amount of the piezoelectric ceramic substrate increased in the range where the thermal conductivity was over 5 W/mK. This is because the difference of thermal histories due to baking becomes larger between the surface of ceramic green sheet 1 on the zirconia setter 2 side and the other surface, so as to result in nonuniformly baking the ceramic green sheet 1.

(4) Reason why arithmetic average roughness of mount surface 2a is 1 μm–20 μm

Figure 8:
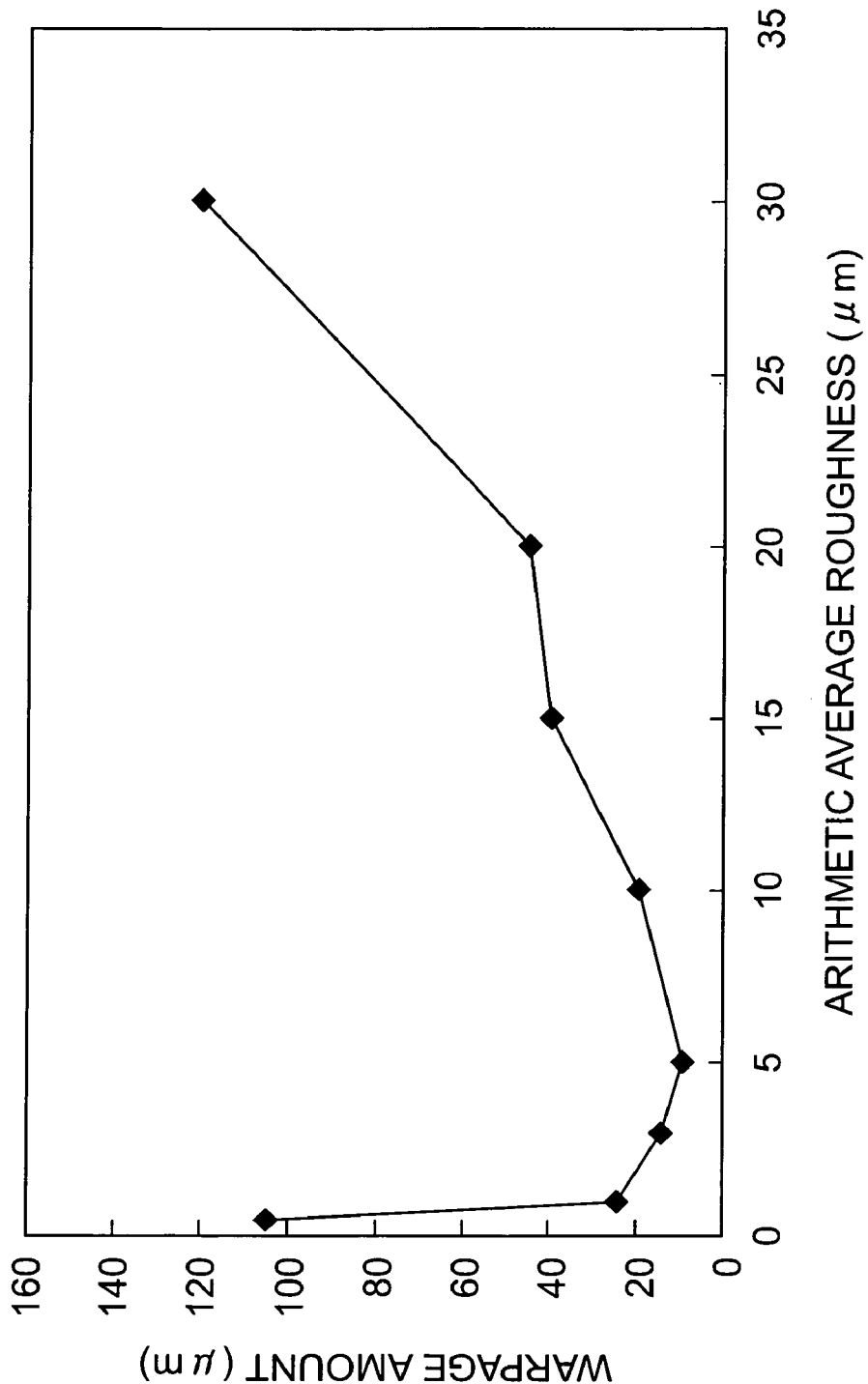
FIG. 8 is a graph showing a relation between arithmetic average roughness of mount surfaces of zirconia setters and amount of warpage of piezoelectric ceramic substrates.

FIG. 8 is a graph showing a relation between arithmetic average roughness of mount surfaces 2a of zirconia setters 2 and warpage amount of piezoelectric ceramic substrates. The other conditions in this case were the average particle size: 1.8 μm, the porcelain density: 6 kg/dm$^3$, and the thermal conductivity: 4.5 W/mK. The arithmetic average roughness is the surface roughness defined in JIS B0601, and is a value obtained by folding back a roughness curve with respect to a center line and dividing an area defined by the roughness curve and center line, by a length.

Figure 9:
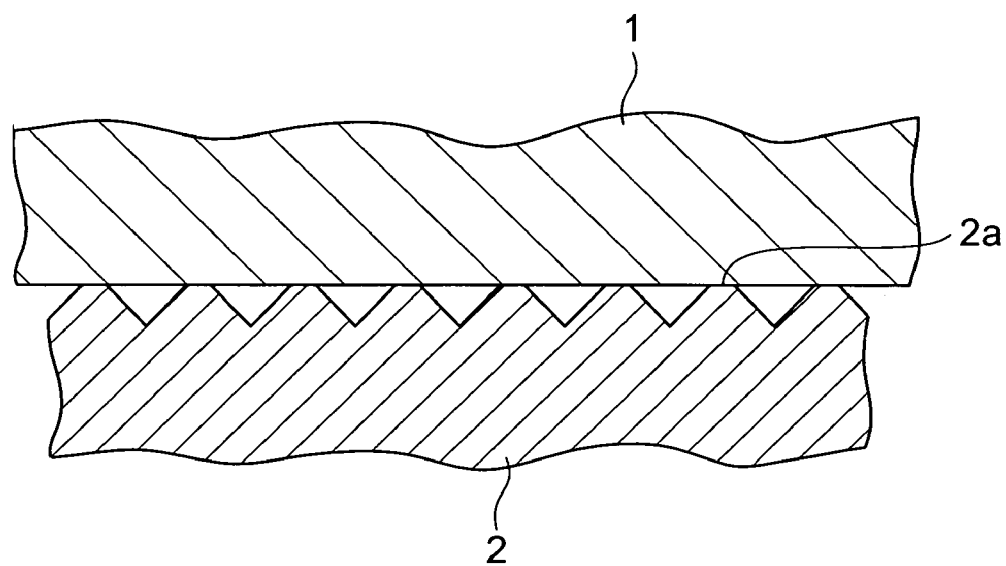
FIG. 9 is an enlarged sectional view of a mount surface of a zirconia setter.

As apparent from the same figure, the warpage amount was controlled to below 50 μm in the range where the arithmetic average roughness was 1 μm–20 μm. The reason for it is as follows. In the range where the arithmetic average roughness is 1 μm–20 μm, as shown in FIG. 9, the contact area is reduced between ceramic green sheet 1 and zirconia setter 2, so that the difference of heat histories due to baking can be made smaller between the surface of ceramic green sheet 1 on the zirconia setter 2 side and the other surface, so as to enable uniform baking of ceramic green sheet 1.

In contrast to it, the warpage amount of the piezoelectric ceramic substrate increased in the ranges where the arithmetic average roughness was below 1 μm and over 20 μm. The reason for it is as follows. In the range where the arithmetic average roughness is less than 1 μm, heat becomes more likely to be transferred from zirconia setter 2 to ceramic green sheet 1, so as to result in failing to decrease the difference of heat histories due to baking between the surface of ceramic green sheet 1 on the zirconia setter 2 side and the other surface. On the other hand, in the range where the arithmetic average roughness is over 20 μm, projections of zirconia setter 2 are caught in ceramic green sheet 1, to cause unevenness of shrinkage of ceramic green sheet 1. In addition, in the range where the arithmetic average roughness is over 20 μm, there could arise a problem that unevenness of zirconia setter 2 is transferred to the surface of the piezoelectric ceramic substrate after baked, on the zirconia setter 2 side.

The above proved that the deformation such as warpage occurring in the piezoelectric ceramic substrate after baked can be suppressed by mounting and baking the ceramic green sheet 1 on the mount surface 2a of zirconia setter 2 wherein the average particle size is 0.3 μm–2.5 μm, the porcelain density is not less than 6 kg/dm$^3$, the thermal conductivity is not more than 5 W/mK, and the arithmetic average roughness of mount surface 2a is 1 μm–20 μm.

Next, the results of evaluation for zirconia setters in Examples and Comparative Examples will be described. The zirconia setters in the examples simultaneously satisfy the above-described conditions of (1) to (4): (1) the average particle size of constituent particles is 0.3 μm–2.5 μm; (2) the porcelain density is not less than 6 kg/dm$^3$; (3) the thermal conductivity is not more than 5 W/mK; (4) the arithmetic average roughness of mount surface is 1 μm–20 μm.

For performing the evaluation on the zirconia setters in Examples and Comparative Examples, the zirconia setters were prepared as follows. First, 12 mol % of yttria ($Y_2O_3$) or ceria ($CeO_2$) was added into zirconia powder, and an organic binder and other ingredients were further added thereinto to obtain granulated powder. This granulated powder was used to effect forming under the pressure of 98 MPa–196 MPa, the debindering step was carried out thereafter, and then baking was conducted at the temperature of 1400° C.–1600° C. in the atmospheric pressure for two hours. Through these steps, the zirconia setters of square thin plate shape were obtained in the size of "100 mm×100 mm and 1.5 mm thick."

Table 1 presents various properties of the zirconia setters in Examples 1–3 and Comparative Examples 1–5 prepared as described above. The average particle size and porcelain density of the zirconia setters can be adjusted to predetermined values by changing the press pressure, additive, and/or baking temperature. By roughening a surface of a molding mold, unevenness to achieve a predetermined arithmetic average roughness can be transferred to the mount surface of each zirconia setter. Furthermore, the average particle size of particles forming each zirconia setter can be decreased by using ceria ($CeO_2$) as a stabilizer.

TABLE 1

| | Properties of zirconia setter | | | | |
|---|---|---|---|---|---|
| | Additive | Average particle size of constituent particles μm | Porcelain density kg/dm$^3$ | Thermal conductivity W/mK | Arithmetic average roughness of mount surface μm |
| Example 1 | $CeO_2$ | 0.30 | 6.1 | 4.1 | 5 |
| Example 2 | $CeO_2$ | 1.8 | 6.2 | 4.2 | 5 |
| Example 3 | $CeO_2$ | 2.5 | 6.2 | 4.8 | 5 |
| Comparative Example 1 | $Y_2O_3$ | 0.15 | 5.8 | 4.0 | 5 |
| Comparative Example 2 | $Y_2O_3$ | 3.7 | 6.0 | 6.1 | 5 |
| Comparative Example 3 | $CeO_2$ | 1.8 | 6.2 | 4.1 | 0.5 |
| Comparative Example 4 | $CeO_2$ | 1.5 | 5.8 | 4.1 | 5 |
| Comparative Example 5 | $Y_2O_3$ | 4.9 | 5.8 | 8.3 | 5 |

| | Properties of piezoelectric ceramic substrate | |
|---|---|---|
| | Warpage amount μm | Ten-spot average roughness μm |
| Example 1 | 20 | 3 |
| Example 2 | 10 | 2 |
| Example 3 | 25 | 5 |
| Comparative Example 1 | 125 | 13 |
| Comparative Example 2 | 110 | 11 |
| Comparative Example 3 | 105 | 15 |
| Comparative Example 4 | 55 | 7 |
| Comparative Example 5 | 140 | 20 |

After the preparation of the zirconia setters, ceramic green sheets were fabricated as follows. First, wet blending with a ball mill was carried out using a material in the form of an oxide or a carbonate in which 0.5% by weight of $Sb_2O_3$ was added into 1 mol of the principal component in the composition of $(Pb_{0.96}Sr_{0.04})(Ti_{0.468}Zr_{0.532})O_3$, and the material resulting from the wet blending was prebaked at 900° C. Subsequently, the prebaked material was subjected to wet milling again with a ball mill, to be micronized, thereby obtaining piezoelectric ceramic powder. An organic binder, an organic solvent, etc. were added into this piezoelectric ceramic powder to obtain a paste, and the paste was formed into a sheet by the doctor blade method to obtain a green sheet in the thickness of 50 µm.

Subsequently, an organic binder, an organic solvent, etc. were added into a metal material in the proportion of silver:palladium=7:3 to obtain a paste, and internal electrodes were formed on each green sheet by screen printing using the paste. Then eight green sheets with the internal electrodes formed thereon were stacked, a green sheet for formation of terminal electrodes was laid as an uppermost layer, and thereafter they were pressed in the stack direction to obtain a green laminate. This green laminate was cut in the rectangular shape of "15 mm×35 mm" to obtain ceramic green sheets.

After preparation of such ceramic green sheets, ten ceramic green sheets were mounted on the mount surface of the zirconia setter first fabricated, and the temperature was kept stable at 400° C. for ten hours, thereby effecting the debindering of the ceramic green sheets.

After the debindering of the ceramic green sheets, spacers 0.5 mm thick were placed at the four corners of the mount surface of each zirconia setter, and ten stages of zirconia setters with the debindered ceramic green sheets thereon were stacked. Furthermore, a zirconia setter with no ceramic green sheet thereon was placed as a top stage. Subsequently, the zirconia setters thus stacked were placed in a hermetically closed sagger, and the temperature was kept stable at 1100° C. for two hours to bake the ceramic green sheets, thereby obtaining piezoelectric ceramic substrates.

According to the method for manufacturing piezoelectric ceramic substrates as described above, hundred piezoelectric ceramic substrates were produced using each of the zirconia setters in Examples 1–3 and in Comparative Examples 1–5. Then amounts of warpage occurring in the hundred piezoelectric ceramic substrates were measured for each of the zirconia setters in Examples 1–3 and in Comparative Examples 1–5, and an average thereof was calculated. The ten-spot average roughness was also measured as to the "surface on the mount surface side of zirconia setter" for each of the hundred piezoelectric ceramic substrates, and an average thereof was calculated. Table 1 provides the average of warpage amounts and the average of ten-spot average roughnesses of hundred piezoelectric ceramic substrates.

Figure 10:
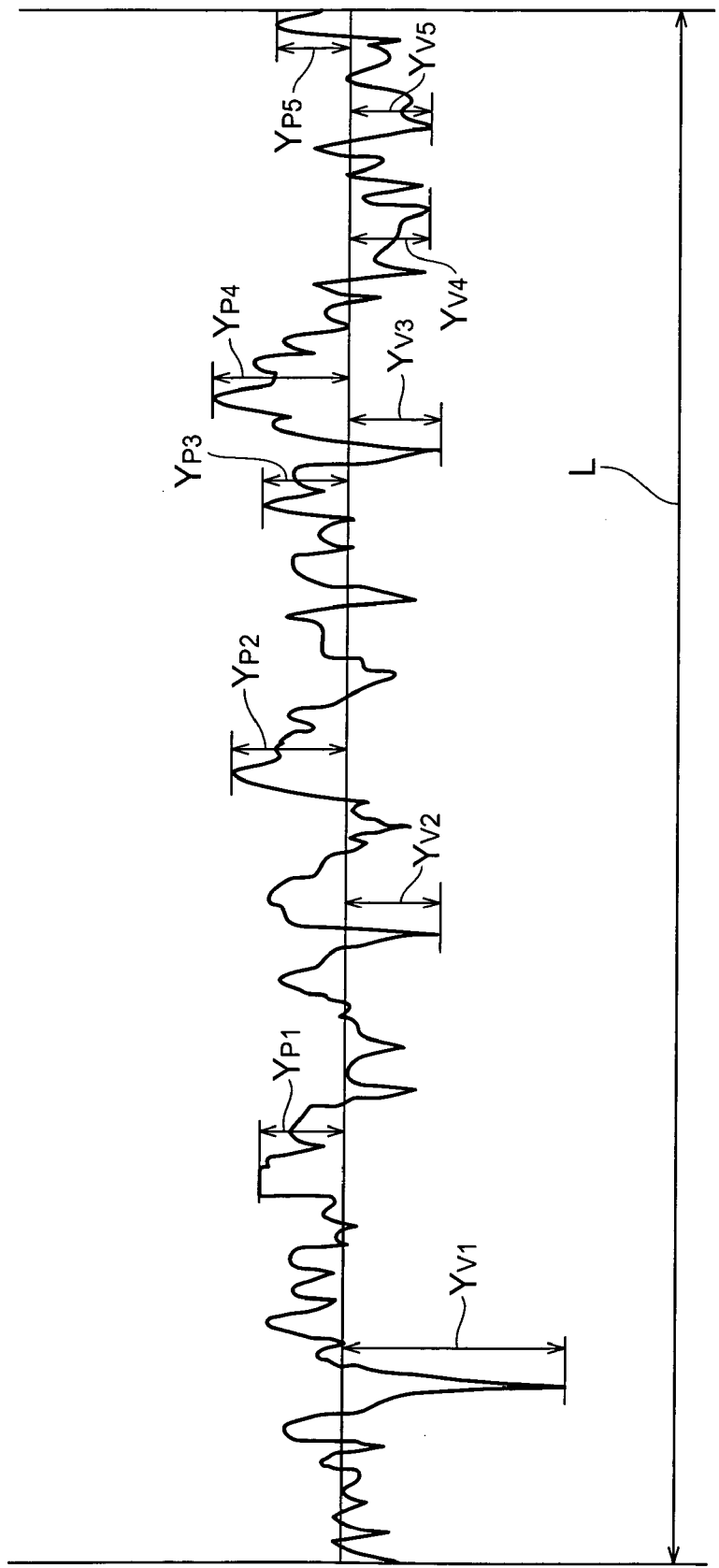
FIG. 10 is an illustration showing the concept of ten-spot average roughness Rz.

The "ten-spot average roughness Rz" is a value obtained as follows: as shown in FIG. 10 and represented by the formula below, a reference length L is cut out from a roughness curve in a direction of an average line thereof, five peaks from the highest to the fifth highest and five troughs from the lowest to the fifth lowest are extracted from the reference length L of the roughness curve, and Rz is obtained as a total of an average of absolute values of levels $Y_P$ of the respective peaks measured from the average line in the cut portion and an average of absolute values of levels $Y_V$ of the respective troughs measured from the average line in the cut portion.

$$Rz = \frac{|Y_{P1} + Y_{P2} + Y_{P3} + Y_{P4} + Y_{P5}| + |Y_{V1} + Y_{V2} + Y_{V3} + Y_{V4} + Y_{V5}|}{5} \quad \text{[Math 1]}$$

Since the ten-spot average roughness Rz is obtained by the calculation method taking account of the five highest values and the five lowest values as described above, sporadic unevenness in the surface can be reflected in the value of ten-spot average roughness Rz.

As apparent from Table 1, the amount of warpage in the piezoelectric ceramic substrates was well controlled to 10 µm–25 µm by use of the zirconia setters in Examples 1–3 simultaneously satisfying the conditions of (1)–(4): (1) the average particle size of constituent particles is 0.3 µm–2.5 µm; (2) the porcelain density is not less than 6 kg/dm$^3$; (3) the thermal conductivity is not more than 5 W/mK; (4) the arithmetic average roughness of mount surface is 1 µm–20 µm. In contrast to it, the amount of warpage in the piezoelectric ceramic substrates was not controlled to below 55 µm by use of the zirconia setters in Comparative Examples 1–5 not simultaneously satisfying the conditions of (1) to (4), and the amount of warpage in the piezoelectric ceramic substrates was not controlled to below 105 µm in the comparative examples except for Comparative Example 4.

The ten-spot average roughness of the "surface on the mount surface side of zirconia setter" in the piezoelectric ceramic substrates was successfully controlled to 2 µm–5 µm by use of the zirconia setters in Examples 1–3 simultaneously satisfying the conditions of (1) to (4). This enables piezoelectric ceramic substrates to be stuck to a metal sheet or the like, for example, without machining of the "surface on the mount surface side of zirconia setter." In contrast to it, the ten-spot average roughness of the "surface on the mount surface side of zirconia setter" in the piezoelectric ceramic substrates was not controlled to below 7 µm by use of the zirconia setters in Comparative Examples 1–5 not simultaneously satisfying the conditions of (1) to (4), and the amount of warpage in the piezoelectric ceramic substrates was not controlled to below 11 µm in the comparative examples except for Comparative Example 4.

The present invention is by no means limited to the above embodiment. For example, the above embodiment concerned the production of the piezoelectric ceramic substrates containing lead, but the present invention is also applicable to production of other ceramic substrates. The above embodiment was directed to the case where the ceramic green sheet and piezoelectric ceramic substrate were laminates, but the present invention is also applicable to ceramic green sheets and ceramic substrates in single-sheet structure.

As described above, the present invention successfully suppresses the deformation such as warpage occurring in the ceramic substrate after baked.

What is claimed is:

1. A setter having a mount surface on which a ceramic green sheet is to be mounted in baking the ceramic green sheet to form a ceramic substrate,
   wherein an average particle size is 0.3 µm–2.5 µm, a porcelain density is not less than 6 kg/dm$^3$, a thermal conductivity is not more than 5 W/mK, and an arithmetic average roughness of the mount surface is 1 µm–20 µm.

2. A method for manufacturing a ceramic substrate, the method comprising:
   preparing a setter wherein an average particle size is 0.3 µm–2.5 µm, a porcelain density is not less than 6 kg/dm$^3$, a thermal conductivity is not more than 5 W/mK, and an arithmetic average roughness of a mount surface is 1 µm–20 µm; and mounting and baking a ceramic green sheet on a mount surface of the setter so as to form the ceramic substrate from the baked green sheet.

* * * * *